(12) United States Patent
Zalewski et al.

(10) Patent No.: US 11,169,278 B2
(45) Date of Patent: Nov. 9, 2021

(54) DEVICE AND METHOD FOR DETECTING AN ERRONEOUS DETERMINATION OF A GEOGRAPHICAL POSITION OF A VEHICLE

(71) Applicants: Continental Automotive GmbH, Hannover (DE); Continental Teves AG & Co. oHG, Frankfurt (DE)

(72) Inventors: Michael Zalewski, Frankfurt am Main (DE); Burkhard Kessler, Laichingen (DE); Sergey Azarkevich, Regensburg (DE); Holger Faisst, Sinzing (DE)

(73) Assignees: Continental Teves AG & Co. oHG; Continental Automotive GmbH

( * ) Notice: Subject to any disclaimer, the term of this patent is extended or adjusted under 35 U.S.C. 154(b) by 329 days.

(21) Appl. No.: 16/318,260

(22) PCT Filed: Aug. 18, 2017

(86) PCT No.: PCT/DE2017/200082
§ 371 (c)(1),
(2) Date: Jan. 16, 2019

(87) PCT Pub. No.: WO2018/033188
PCT Pub. Date: Feb. 22, 2018

(65) Prior Publication Data
US 2019/0227177 A1    Jul. 25, 2019

(30) Foreign Application Priority Data
Aug. 19, 2016   (DE) ..................... 10 2016 215 645.4

(51) Int. Cl.
*G01S 19/39*   (2010.01)
*G01S 19/53*   (2010.01)
(Continued)

(52) U.S. Cl.
CPC .......... *G01S 19/396* (2019.08); *G01S 19/393* (2019.08); *G01S 19/53* (2013.01); *G01S 19/22* (2013.01); *G01S 19/52* (2013.01)

(58) Field of Classification Search
CPC ....................................................... G01S 19/396
See application file for complete search history.

(56) References Cited

U.S. PATENT DOCUMENTS 6,671,587 B2 * 12/2003 Hrovat .................... B60T 8/172
                                                                 342/357.36
7,957,897 B2    6/2011 Basnayake et al.
(Continued)

FOREIGN PATENT DOCUMENTS

DE    102008030071 A1    5/2009
DE    102011008608 A1    7/2011
(Continued)

OTHER PUBLICATIONS

Petovello, Mark. "GNSS Solutions—How Does a GNSS Receiver Estimate Velocity?" InsideGNSS Mar./Apr. 2015. pp. 1-4. (Year: 2015).*
(Continued)

*Primary Examiner* — Gregory C. Issing
(74) *Attorney, Agent, or Firm* — RatnerPrestia

(57) ABSTRACT

A device and a method for detecting an erroneous determination of a geographical position of a vehicle. The device includes a sensor that is configured to determine a first yaw rate of the vehicle, a satellite navigation receiver that is configured to receive satellite signals during a predetermined time period, to determine a multiplicity of geographical positions of the vehicle on the basis of the received satellite signals, and to determine a geographical reference position of the vehicle on the basis of the multiplicity of geographical positions, and a processor that is configured to determine a second yaw rate of the vehicle on the basis of (Continued)

the determined geographical reference position of the vehicle, and to compare the first yaw rate with the second yaw rate in order to detect the erroneous determination of the geographical position of the vehicle.

13 Claims, 4 Drawing Sheets

(51) Int. Cl.
    *G01S 19/22*     (2010.01)
    *G01S 19/52*     (2010.01)

(56) References Cited

U.S. PATENT DOCUMENTS

| | | | | |
|---|---|---|---|---|
| 8,149,163 | B2* | 4/2012 | Toda | G01S 19/254 |
| | | | | 342/357.61 |
| 8,326,532 | B2* | 12/2012 | Kmiecik | G01S 19/23 |
| | | | | 701/472 |
| 8,700,324 | B2* | 4/2014 | Halder | G01C 21/165 |
| | | | | 701/498 |
| 8,706,347 | B2* | 4/2014 | Bae | G01B 21/26 |
| | | | | 701/31.4 |
| 2002/0158796 | A1* | 10/2002 | Humphrey | G01S 19/49 |
| | | | | 342/357.31 |
| 2011/0153266 | A1* | 6/2011 | Shankwitz | G01C 21/165 |
| | | | | 702/150 |
| 2013/0311085 | A1* | 11/2013 | Toda | G01C 21/165 |
| | | | | 701/445 |

FOREIGN PATENT DOCUMENTS

| | | |
|---|---|---|
| EP | 1818682 A1 | 8/2007 |
| JP | 07167871 A | 7/1995 |
| JP | 2002323551 A | 11/2002 |
| WO | 02086533 A2 | 10/2002 |

OTHER PUBLICATIONS

German Search Report for German Application No. 10 2016 215 645.4, dated Aug. 8, 2017, with partial translation—11 pages.
International Search Report and Written Opinion for Application No. PCT/DE2017/200082, dated Nov. 21, 2017—11 pages.

* cited by examiner

DEVICE AND METHOD FOR DETECTING AN ERRONEOUS DETERMINATION OF A GEOGRAPHICAL POSITION OF A VEHICLE

CROSS REFERENCE TO RELATED APPLICATIONS

This application is the U.S. National Phase Application of PCT International Application No. PCT/DE2017/200082, filed Aug. 18, 2017, which claims priority to German Patent Application No. 10 2016 215 645.4, filed Aug. 19, 2016, the contents of such applications being incorporated by reference herein.

FIELD OF THE INVENTION

The present invention relates to a device and a method for detecting an erroneous determination of a geographical position of a vehicle, in particular an erroneous geographical position of a vehicle determined on the basis of a satellite navigation receiver.

BACKGROUND OF THE INVENTION

Interference caused by multipath effects (as they are commonly known) is the main cause of erroneous determinations of positions in GNSS processing. Multipath effects arise as a result of a direct satellite signal being overlaid with a reflection, such as for example off metal facades of houses, of the direct satellite signal. Interference caused by multipath effects occurs both in the context of constructive and in the context of destructive interference between the reflected and the direct satellite signal. Methods and devices for detecting interference caused by multipath effects are a challenge for GNSS processing, as one or more interference-impacted measurements, if they are not compensated or filtered, lead to an incorrect position determination and a corresponding position error. Particular processing operations such as differential GNSS processing also lead to a higher absolute position accuracy, but are affected by multipath effects to the same extent as normal GNSS processing operations.

Furthermore, the position and speed of a vehicle, determined by satellite navigation receivers, may be used for data fusion or dead reckoning. The position and speed determined by satellite navigation receivers are frequently also used in a general fusion filter, for example in a Kalman filter, in order to assist in or to correct the position or speed estimation of the Kalman filter. Using an estimation filter, it is possible to detect outliers, that is to say jumps or large deviations in a position of the vehicle, as erroneous and to discard them. Rough multipath effects are therefore able to be suppressed.

By contrast, creeping effects of the satellite signals are critical, in which the erroneous multipath effects that lead to a change in position of the vehicle do not occur in the manner of jumps but with a slowly increasing so-called position drift, as is described for example in FIG. 1. FIG. 1 shows various trajectories of a vehicle, for example an actual trajectory 10, an unfiltered GPS trajectory 20, a trajectory 30 determined by a fusion algorithm and a filtered GPS trajectory 40.

Furthermore, the erroneous position determinations from satellite navigation receivers may also interfere with other sensor measurements, in that false correction values for the other sensors may be determined on the basis of the erroneous position determinations from satellite navigation receivers.

Detecting such creeping multipath effects of satellite signals, which may lead to an erroneous determination of a geographical position of a vehicle, is a particular challenge for processing satellite signals.

SUMMARY OF THE INVENTION

An aspect of the present invention is a device and a method for detecting an erroneous determination of a geographical position of a vehicle.

According to a first aspect, a device for detecting an erroneous determination of a geographical position of a vehicle is provided. The device comprises a sensor that is configured to determine a first yaw rate of the vehicle, a satellite navigation receiver that is configured to receive satellite signals during a first predetermined time period, to determine a multiplicity of geographical positions of the vehicle on the basis of the received satellite signals, and to determine a geographical reference position of the vehicle on the basis of the multiplicity of geographical positions, and a processor that is configured to determine a second yaw rate of the vehicle on the basis of the determined geographical reference position of the vehicle, and to compare the first yaw rate with the second yaw rate in order to detect the erroneous determination of the geographical position of the vehicle.

By virtue of this, for example, the technical advantage is achieved that an erroneous determination of a geographical position of the vehicle is able to be detected early, the erroneous determination of the position being able to be caused by multipath effects of the received satellite signals. Furthermore, by virtue of this, for example, the technical advantage is achieved that, by receiving satellite signals during a predetermined time period, subsequent detection and compensation of the erroneous determination of the position is possible, since it is able to be detected when and which effect was introduced into the device by the above-mentioned multipath effects.

Furthermore, by virtue of this, for example, the technical advantage is achieved that, since the yaw rate determined by the satellite navigation receiver is able to be checked, an ASIL (automotive safety integrity level) functionality is able to be implemented on the basis of the satellite signals, since resulting errors from the satellite signals are able to be detected and filtered.

The device may be applied in automobiles, in aircraft or in ships.

According to one preferred embodiment of the device, the sensor is a rate of rotation sensor.

According to one preferred embodiment of the device, the satellite navigation receiver is furthermore configured to determine a speed of the vehicle on the basis of a Doppler effect of the received satellite signals.

According to one preferred embodiment of the device, the processor is furthermore configured to determine a third yaw rate of the vehicle on the basis of the speed of the vehicle determined by the satellite navigation receiver and to compare the third yaw rate with the first yaw rate in order to detect the erroneous determination of the geographical position of the vehicle if a first difference between the first yaw rate and the third yaw rate exceeds a first predetermined tolerance threshold value.

According to one preferred embodiment of the device, the processor is furthermore configured to determine the second yaw rate Δφ/Δt of the vehicle on the basis of the following formula:

$$\frac{\Delta\varphi}{\Delta t} = \frac{1}{\Delta t}\mathrm{atan}\left[\frac{Y_1 - Y_2}{X_2 - X_3}\right],$$

wherein Δφ is a yaw angle of the vehicle, Δt is a time interval, $Y_1$ is a second coordinate of the geographical position of the vehicle last determined by the satellite navigation receiver, $X_2$ is a first coordinate of the determined geographical reference position of the vehicle, $Y_2$ is a second coordinate of the determined geographical reference position of the vehicle, and $X_3$ is a coordinate of a previous determined geographical position of the vehicle.

According to one preferred embodiment of the device, the processor is furthermore configured to determine the second yaw rate Δφ/Δt of the vehicle on the basis of the following formula:

$$\frac{\Delta\varphi}{\Delta t} = \frac{1}{\Delta t}\mathrm{atan}\left[\frac{\sqrt{(X_1 - X_2)^2 + (Y_1 - Y_2)^2}}{(X_2 - X_3)^2 + (Y_2 - Y_3)^2}\right],$$

wherein $X_1$ is a first coordinate of the geographical position of the vehicle last determined by the satellite navigation receiver, and $Y_3$ is a second coordinate of a previous determined geographical position of the vehicle.

According to one preferred embodiment of the device, the processor is furthermore configured to detect the erroneous determination of the geographical position of the vehicle if a second difference between the first yaw rate and the second yaw rate exceeds a second predetermined tolerance threshold value.

According to one preferred embodiment of the device, the processor is furthermore configured to discard the geographical position last determined by the satellite navigation receiver if the processor detects the erroneous determination of the geographical position of the vehicle.

According to one preferred embodiment of the device, the processor is furthermore configured to use an estimation filter to determine the geographical reference position of the vehicle.

According to one preferred embodiment of the device, the estimation filter is a Kalman filter.

According to one preferred embodiment of the device, the satellite navigation receiver is a NAVSTAR GPS, a GLONASS, a GALILEO or a BEIDOU satellite navigation receiver.

According to one preferred embodiment of the device, the predetermined time period is 5 seconds.

According to a second aspect, the object is achieved by a method for detecting an erroneous determination of a geographical position of a vehicle. The method comprises the following steps: determining a first yaw rate of the vehicle, receiving satellite signals during a predetermined time period, determining a multiplicity of geographical positions of the vehicle on the basis of the received satellite signals, determining a geographical reference position of the vehicle on the basis of the determined multiplicity of geographical positions, determining a second yaw rate of the vehicle on the basis of the determined geographical reference position of the vehicle, and comparing the first yaw rate with the second yaw rate in order to detect the erroneous determination of the geographical position of the vehicle.

The method may be performed by the device. Further features of the method result directly from the features and/or the functionality of the device.

According to a third aspect, the object is achieved by a computer program having program code for performing the method according to the second aspect when the program code is executed on a computer.

BRIEF DESCRIPTION OF THE DRAWINGS

Further exemplary embodiments are explained in more detail with reference to the appended figures.

DETAILED DESCRIPTION OF THE PREFERRED EMBODIMENTS

In the following detailed description, reference is made to the accompanying drawings, which form a part thereof and which show, as an illustration, specific embodiments in which the invention is able to be carried out. It goes without saying that other embodiments may also be used and structural or logical changes may be made without departing from the concept of the present invention. The following detailed description should therefore not be understood in a restrictive sense. It also goes without saying that the features of the various exemplary embodiments described herein may be combined with one another unless specifically stated otherwise.

The aspects and embodiments are described with reference to the drawings, wherein identical reference signs generally relate to identical elements. Numerous specific details are stated in the following description for the purposes of explanation in order to provide an in-depth understanding of one or more aspects of the invention. However, it may be obvious to a person skilled in the art that one or more aspects or embodiments may be implemented with a lower degree of the specific details. In other cases, known structures and elements are illustrated in a schematic form in order to facilitate the description of one or more aspects or embodiments. It goes without saying that other embodiments may be used and structural or logical changes may be made without departing from the concept of the present invention.

Even though a particular feature or a particular aspect of an embodiment may have been disclosed with respect to only one of a plurality of implementations, such a feature or such an aspect may also be combined with one or more other features or aspects of the other implementations, as may be desired and advantageous for a given or particular application. Furthermore, to the extent to which the expressions "contain", "have", "having" or other variants thereof are used either in the detailed description or in the claims, such expressions are intended to be inclusive in a manner similar to the expression "comprise". The expressions "coupled" and "connected" may have been used together with derivatives thereof. It goes without saying that such expressions are used to state that two elements cooperate or interact with one another irrespective of whether they are in direct physical or electrical contact or are not in direct contact with one another. In addition, the expression "exemplary" should be interpreted only as an example instead of denoting the best or optimum case. The following description should therefore not be understood in a restrictive sense.

Figure 2:
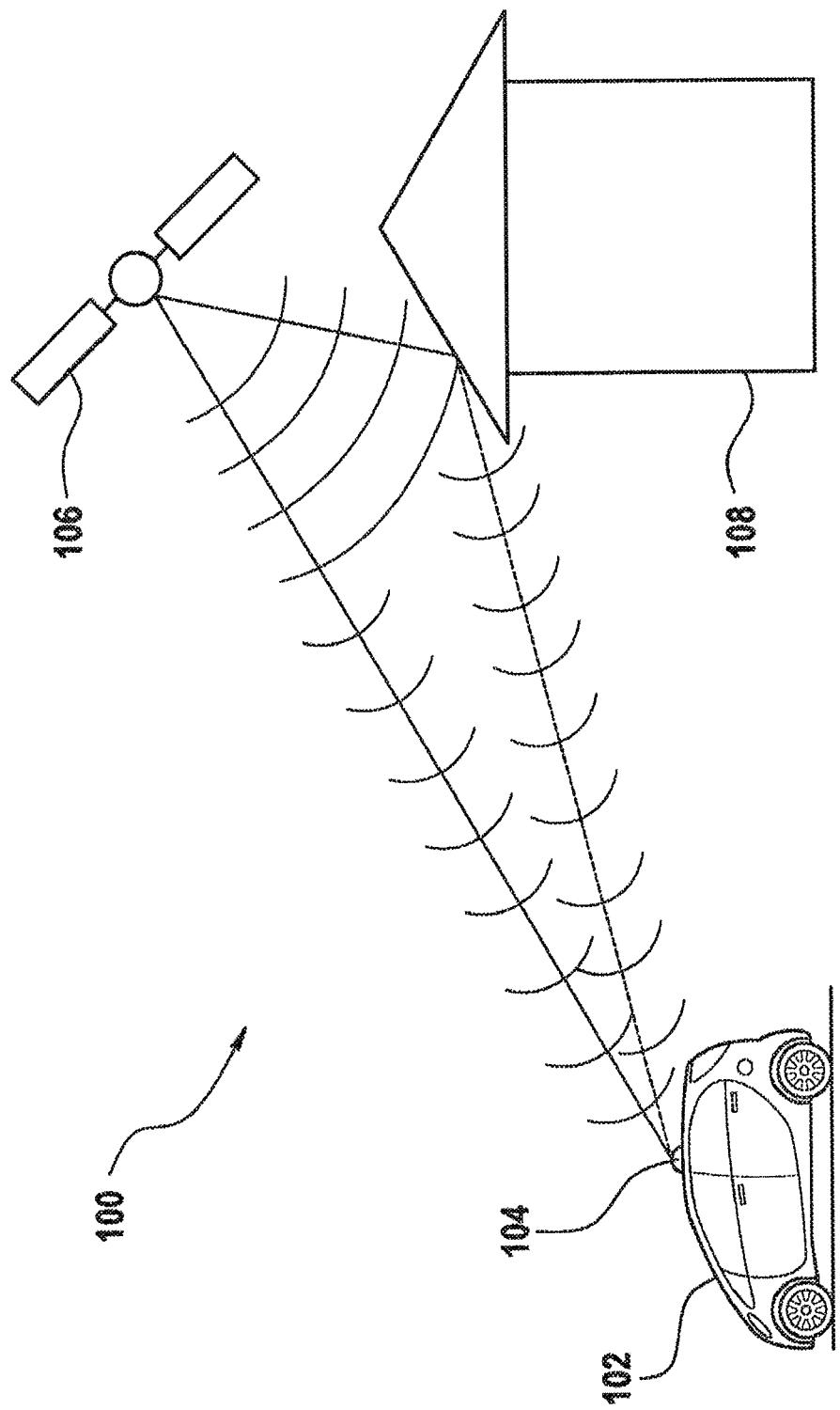
FIG. 2 shows a schematic depiction of an arrangement that comprises a device for detecting an erroneous determination of a geographical position of a vehicle, according to one embodiment.

FIG. 2 shows a schematic depiction of an arrangement 100 that comprises a device for detecting an erroneous determination of a geographical position of a vehicle 102, according to one embodiment. According to one embodiment, the arrangement 100 comprises a vehicle 102, an object 108 and a satellite 106. According to one embodiment, the vehicle 102 comprises a device for detecting an erroneous determination of a geographical position of the vehicle 102, wherein the device comprises a satellite navigation receiver 104, a sensor and a processor.

The satellite navigation receiver 104 may be configured to receive satellite signals during a predetermined time period, to determine a multiplicity of geographical positions of the vehicle 102 on the basis of the received satellite signals, and to determine a geographical reference position 102b of the vehicle 102 on the basis of the multiplicity of geographical positions. Furthermore, the satellite navigation receiver 104 may be configured to evaluate a speed of the vehicle 102, wherein the speed of the vehicle 102 may be determined on the basis of Doppler effects of the satellite signals. Determining a multiplicity of geographical positions of the vehicle 102 during a predetermined time period or a path that is covered has for example the advantage that the yaw rate of the vehicle 102 is able to be determined by the satellite navigation receiver 104 on the basis of changes in position of the vehicle 102, on the one hand, and on the basis of changes in the directions of the speed of the vehicle 102, on the other hand.

By virtue of this, for example, the technical advantage is achieved that an evaluation of the interference in the satellite signals is able to be performed independently between position of the vehicle 102 and speed of the vehicle 102 or is able to be correlated if the speed of the vehicle 102 also matches the changes in the determined geographical positions of the vehicle 102.

According to one embodiment, the sensor is configured to determine a first yaw rate of the vehicle 102. The sensor and the satellite navigation receiver 104 may be connected to the processor. The processor may be configured to determine a second yaw rate of the vehicle 102 on the basis of the determined geographical reference position 102b of the vehicle 102, and to compare the first yaw rate with the second yaw rate in order to detect the erroneous determination of the geographical position of the vehicle 102.

Figure 1:
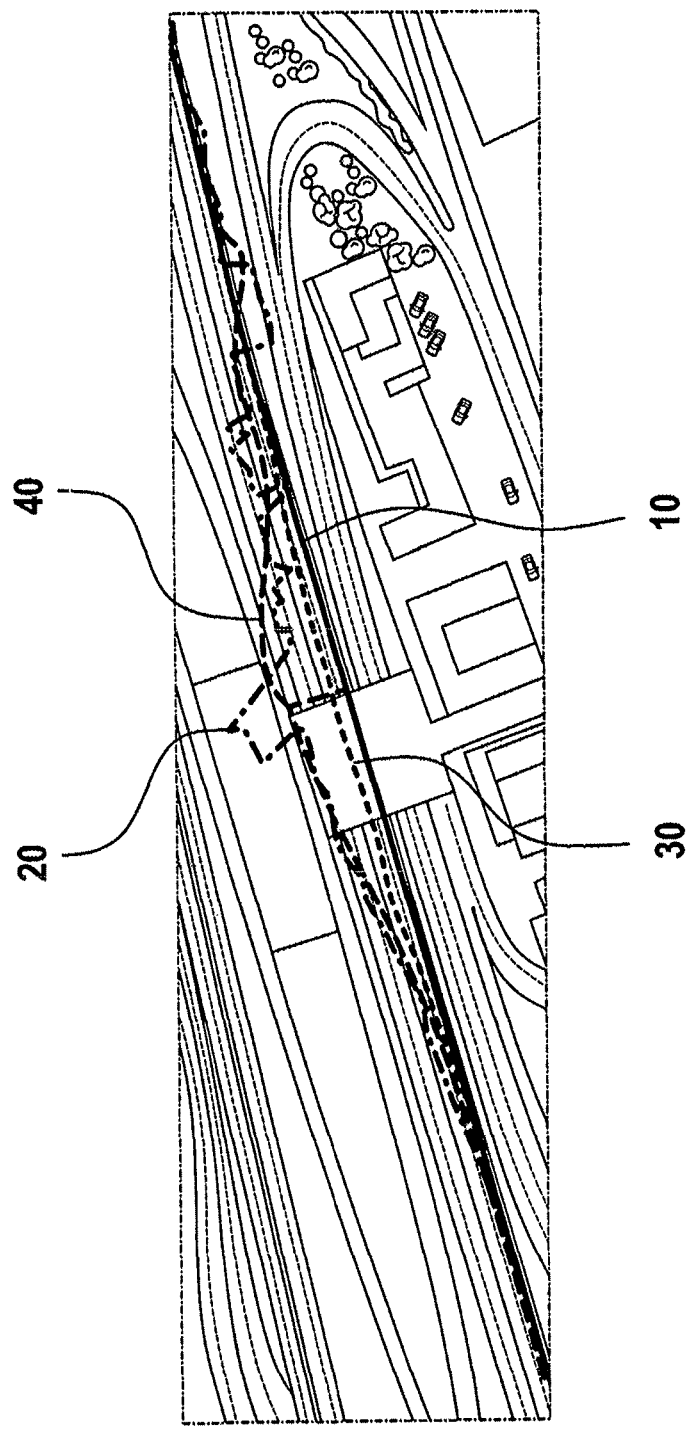
FIG. 1 shows a comparison between an actual trajectory of a vehicle and other trajectories of the vehicle that are determined using various methods.

By virtue of this, for example, the technical advantage is achieved that an erroneous determination of the geographical position of the vehicle 102 or a position drift lateral to the direction of travel (see FIG. 1) are reflected in a resultant yaw rate. This may in this case be compared very readily with values of other yaw rates, wherein the values of the other yaw rates may be determined for example on the basis of an inertial measurement unit (IMU) sensor, a steering wheel angle, an odometry sensor, a magnetic sensor, wheel speeds or fusion filters. By virtue of this, for example, the technical advantage is achieved that multipath effects, which would lead to an erroneous determination of the geographical position of the vehicle 102 or to a change in orientation of the vehicle 102, are able to be detected very readily and quickly if a difference between the yaw rate determined on the basis of satellite signals and a yaw rate determined using sensors or fusion filters exceeds a predetermined tolerance threshold value. The tolerance threshold value may be determined for example on the basis of the accuracy of the second yaw rate and the accuracy of the first yaw rate.

The erroneous determination of the geographical position of the vehicle 102 may be caused by multipath effects, wherein the multipath effects occur when an antenna of the satellite navigation receiver 104 is situated in the vicinity of a highly reflective object 108, for example a building. The satellite signal then does not travel directly to the antenna, but first of all impinges on the object 108 so as then to be reflected to the antenna, which may lead to an erroneous determination of the geographical position of the vehicle 102.

Figure 3:
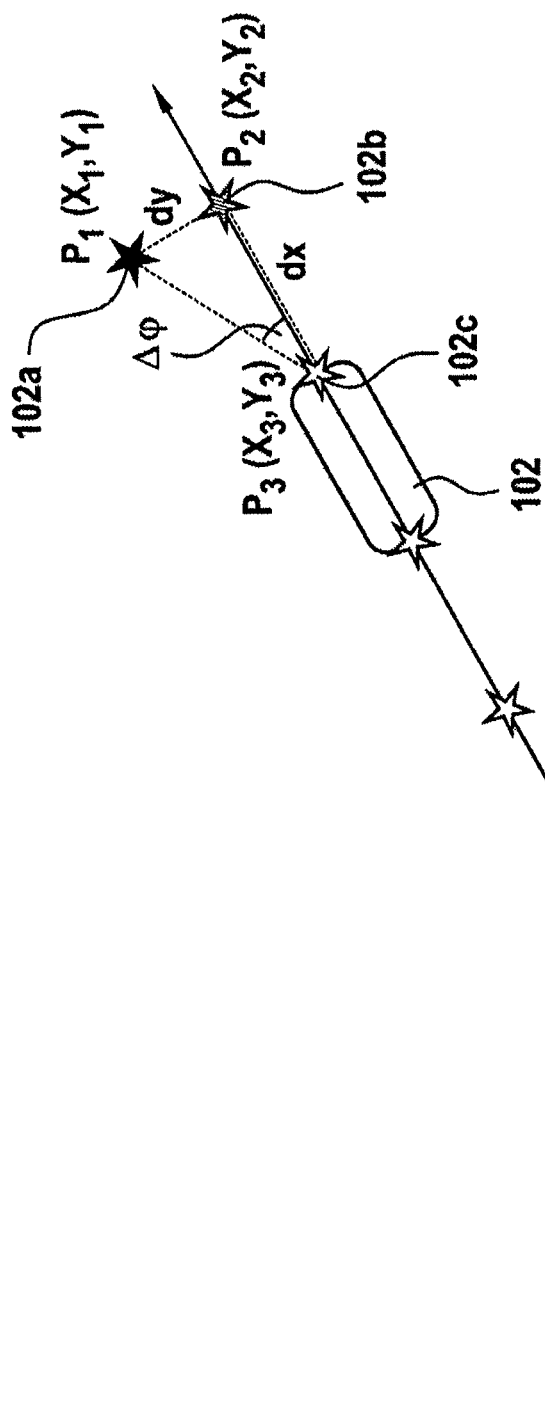
FIG. 3 shows a schematic depiction of a trajectory of a vehicle according to one embodiment.

FIG. 3 shows a schematic depiction of a trajectory of a vehicle 102 according to one embodiment. The trajectory of the vehicle 102 may be ascertained on the basis of a multiplicity of geographical positions that are determined by the satellite navigation receiver 104. Furthermore, the satellite navigation receiver 104 may be configured, with each new determination of the geographical position of the vehicle 102, to use the position progression of the vehicle 102 over for example the last 5 seconds or $100m$ in order to determine a second yaw rate $\Delta\varphi/\Delta t$ therefor, wherein $\Delta\varphi/\Delta t$ may be determined by the processor on the basis of the following formula:

$$\frac{\Delta\varphi}{\Delta t} = \frac{1}{\Delta t}\mathrm{atan}\left[\frac{Y_1 - Y_2}{X_2 - X_3}\right],$$

wherein $\Delta\varphi$ is a yaw angle of the vehicle 102, $\Delta t$ is a time interval, $Y_1$ is a second coordinate of the geographical position 102a of the vehicle 102 last determined by the satellite navigation receiver 104, $X_2$ is a first coordinate of a geographical reference position 102b of the vehicle 102, $Y_2$ is a second coordinate of the geographical reference position 102b of the vehicle 102, and $X_3$ is a coordinate of a previous determined geographical position 102c of the vehicle 102. According to one embodiment, the satellite navigation receiver 104 may be configured to determine the previous determined geographical position 102c of the vehicle 102 and the geographical reference position 102b of the vehicle 102 on the basis of a Kalman filter. Furthermore, the processor may be configured to determine the reference position of the vehicle 102 on the basis of a motion theory or of an alignment model.

The position 102a of the vehicle 102 may be determined by the satellite navigation receiver 104 by way of pseudo-range measurements or carrier phase measurements or a combination thereof.

According to a further embodiment, the processor may be configured to convert the coordinates of the last determined geographical position 102a, of the previous determined geographical position 102c and of the geographical reference position 102b into vehicle coordinates.

Furthermore, the processor may be configured to compare the second yaw rate $\Delta\varphi/\Delta t$ with a first yaw rate that is determined for example by a rate of rotation sensor of the vehicle 102 and to discard the last determined geographical position 102a if a difference between the second yaw rate $\Delta\varphi/\Delta t$ and the first yaw rate exceeds a predetermined tolerance threshold value.

According to a further embodiment, the processor may be configured to determine a third yaw rate $\Delta\varphi^*/\Delta t$ on the basis of the following formula:

$$\frac{\Delta\varphi^*}{\Delta t} = \frac{1}{\Delta t}\mathrm{atan}\left[\frac{v_y}{v_x}\right],$$

wherein $v_x$ and $v_y$ are speed components of the vehicle 102 that may be determined on the basis of GNSS Doppler speed measurement.

According to a further embodiment, the processor may be configured to determine the third yaw rate $\Delta\varphi^*/\Delta t$ on the basis of the following formula:

$$\frac{\Delta\varphi^*}{\Delta t} = \frac{1}{\Delta t}(\varphi_2 - \varphi_1) = \frac{1}{\Delta t}\left(\mathrm{atan}\left[\frac{v_{Y_1}}{v_{X_2}}\right] - \mathrm{atan}\left[\frac{v_{Y_1}}{v_{X_3}}\right]\right),$$

wherein $v_{Y_2}$, $v_{X_2}$, $v_{Y_1}$ and $v_{X_3}$ are speed components of the vehicle 102 that may be determined on the basis of GNSS Doppler speed measurements.

As the rate of rotation sensors measure a change in orientation fixed to the vehicle but the measurements from the satellite navigation receiver 104 only describe point movements independent of the vehicle, a device is therefore created that detects an erroneous determination of the position or a lateral position drift and filters it out.

Figure 4:
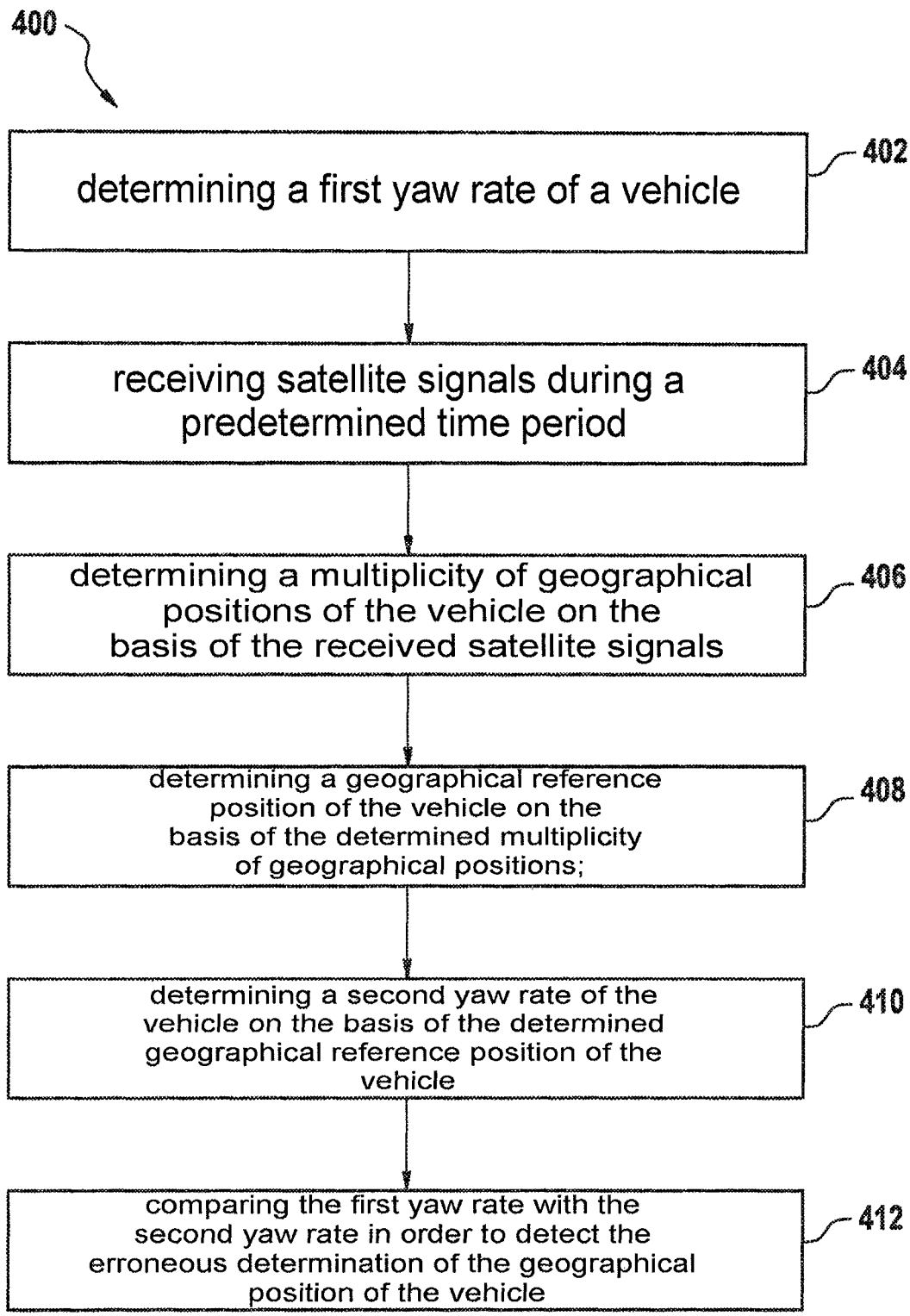
FIG. 4 shows a schematic depiction of a method for detecting an erroneous determination of a geographical position of a vehicle according to one embodiment.

FIG. 4 shows a schematic depiction of a method 400 for detecting an erroneous determination of a geographical position of a vehicle 102 according to one embodiment. The method 400 comprises the following steps: determining 402 a first yaw rate of the vehicle 102, receiving 404 satellite signals during a predetermined time period, determining 406 a multiplicity of geographical positions of the vehicle 102 on the basis of the received satellite signals, determining 408 a geographical reference position 102b of the vehicle 102 on the basis of the determined multiplicity of geographical positions, determining 410 a second yaw rate of the vehicle 102 on the basis of the determined geographical reference position 102b of the vehicle 102, and comparing 412 the first yaw rate with the second yaw rate in order to detect the erroneous determination of the geographical position of the vehicle 102.

LIST OF REFERENCE SIGNS

10 Actual trajectory
20 Unfiltered GPS trajectory
30 Fusion algorithm trajectory
40 Filtered GPS trajectory
100 Arrangement
102 Vehicle
102a Position (measured) $P_1$
102b Reference position $P_2$
102c Position (historic) $P_3$
104 Satellite navigation receiver
106 Satellite
108 Object
400 Method
402 Determination
404 Reception
406 Determination
408 Determination
410 Determination
412 Comparison

The invention claimed is:

1. A device for detecting an erroneous determination of a geographical position of a vehicle, comprising:
a sensor that is configured to determine a first yaw rate of the vehicle;
a satellite navigation receiver that is configured to receive satellite signals during a predetermined time period, to determine a multiplicity of geographical positions of the vehicle on the basis of the received satellite signals including a current geographical position at a current time, and a plurality of previous geographical positions at previous times, and to determine an expected geographical reference position of the vehicle at the current time on the basis of a trajectory formed by the plurality of previous geographical positions; and
a processor that is configured to:
determine a second yaw rate of the vehicle based on a first difference between a coordinate of the current geographical position and a coordinate of the geographical reference position of the vehicle, based on a second difference between a coordinate of at least one of the plurality of previous geographical positions and a coordinate of the geographical reference position of the vehicle, and based on a time interval that the vehicle takes to travel from the at least one of the plurality of previous geographical positions to the current geographical position,
perform a comparison of the first yaw rate with the second yaw rate, and
when the comparison indicates that the second yaw rate is out of tolerance with the first yaw rate determine that the current position is an erroneous geographical position of the vehicle, and exclude the erroneous geographical position of the vehicle from the trajectory.

2. The device as claimed in claim 1, wherein the sensor is a rate of rotation sensor.

3. The device as claimed in claim 2, wherein the satellite navigation receiver is furthermore configured to determine a speed of the vehicle on the basis of a Doppler effect of the received satellite signals.

4. The device as claimed in claim 3, wherein the processor is furthermore configured to determine a third yaw rate of the vehicle on the basis of the speed of the vehicle determined by the satellite navigation receiver and to compare the third yaw rate with the first yaw rate in order to detect the erroneous determination of the geographical position of the vehicle if a first difference between the first yaw rate and the third yaw rate exceeds a first predetermined tolerance threshold value.

5. The device as claimed in claim 1, wherein the processor is furthermore configured to determine the second yaw rate $\Delta\varphi/\Delta t$ of the vehicle on the basis of the following formula:

$$\frac{\Delta\phi}{\Delta t} = \frac{1}{\Delta t}\mathrm{atan}\left[\frac{Y_1 - Y_2}{X_2 - X_3}\right],$$

wherein $\Delta\varphi$ is a yaw angle of the vehicle, $\Delta t$ is a time interval, $Y_1$ is a second coordinate of the geographical position of the vehicle most recently determined by the satellite navigation receiver, $X_2$ is a first coordinate of the determined geographical reference position of the vehicle, $Y_2$ is a second coordinate of the determined geographical reference position of the vehicle, and $X_3$ is a coordinate of a geographical position of the vehicle determined prior to the most recently determined geographical position.

6. The device as claimed in claim 1, wherein the processor is furthermore configured to detect the erroneous determination of the geographical position of the vehicle if a second difference between the first yaw rate and the second yaw rate exceeds a second predetermined tolerance threshold value.

7. The device as claimed in claim 1, wherein the processor is furthermore configured to discard the geographical position last determined by the satellite navigation receiver if the processor detects the erroneous determination of the geographical position of the vehicle.

8. The device as claimed in claim 1, wherein the processor is furthermore configured to use an estimation filter to determine the geographical reference position of the vehicle.

9. The device as claimed in claim 8, wherein the estimation filter is a Kalman filter.

10. The device as claimed in claim 1, wherein the satellite navigation receiver is a NAVSTAR GPS, a GLONASS, a GALILEO or a BEIDOU satellite navigation receiver.

11. The device as claimed in claim 9, wherein the predetermined time period is 5 seconds.

12. A method for detecting an erroneous determination of a geographical position of a vehicle, comprising:
 determining a first yaw rate of the vehicle;
 receiving satellite signals during a predetermined time period;
 determining a multiplicity of geographical positions of the vehicle on the basis of the received satellite signals including a current geographical position at a current time, and a plurality of previous geographical positions at previous times;
 determining an expected geographical reference position of the vehicle at the current time on the basis of a trajectory formed by the plurality of previous geographical positions;
 determining a second yaw rate of the vehicle based on a first difference between a coordinate of the current geographical position and a coordinate of the geographical reference position of the vehicle, based on a second difference between a coordinate of at least one of the plurality of previous geographical positions and a coordinate of the geographical reference position of the vehicle, and based on a time interval that the vehicle takes to travel from the at least one of the plurality of previous geographical positions to the current geographical position;
 perform a comparison of the first yaw rate with the second yaw rate; and
 when the comparison indicates that the second yaw rate is out of tolerance with the first yaw rate determine that the current position is an erroneous geographical position of the vehicle, and exclude the erroneous geographical position of the vehicle from the trajectory.

13. A non-transitory computer-readable data storage medium comprising a program code stored thereon that when executed by a processor performs:
 determining a first yaw rate of the vehicle;
 receiving satellite signals during a predetermined time period;
 determining a multiplicity of geographical positions of the vehicle on the basis of the received satellite signals including a current geographical position at a current time, and a plurality of previous geographical positions at previous times;
 determining an expected geographical reference position of the vehicle at the current time on the basis of a trajectory formed by the plurality of previous geographical positions;
 determining a second yaw rate of the vehicle based on a first difference between a coordinate of the current geographical position and a coordinate of the geographical reference position of the vehicle, based on a second difference between a coordinate of at least one of the plurality of previous geographical positions and a coordinate of the geographical reference position of the vehicle, and based on a time interval that the vehicle takes to travel from the at least one of the plurality of previous geographical positions to the current geographical position;
 perform a comparison of the first yaw rate with the second yaw rate; and
 when the comparison indicates that the second yaw rate is out of tolerance with the first yaw rate determine that the current position is an erroneous geographical position of the vehicle, and exclude the erroneous geographical position of the vehicle from the trajectory.

\* \* \* \* \*